United States Patent [19]

McLaughlin et al.

[11] 4,379,886
[45] Apr. 12, 1983

[54] LIQUID COATING COMPOSITION HAVING A REACTIVE CATALYST

[75] Inventors: Joseph E. McLaughlin; George A. Strickland, both of Philadelphia, Pa.

[73] Assignee: E. I. Du Pont de Nemours and Company, Wilmington, Del.

[21] Appl. No.: 280,132

[22] Filed: Jul. 2, 1981

Related U.S. Application Data

[62] Division of Ser. No. 144,299, Apr. 28, 1980.

[51] Int. Cl.³ .................... C08L 61/28; C08L 61/24
[52] U.S. Cl. .................................. 525/162; 525/110; 525/157; 525/443; 525/511; 525/514
[58] Field of Search ............... 525/162, 443, 514, 510, 525/511, 110; 528/296

[56] References Cited

U.S. PATENT DOCUMENTS

| | | | |
|---|---|---|---|
| 2,821,542 | 1/1958 | Schmutzler | 260/475 |
| 2,939,857 | 6/1960 | Bolton et al. | 260/45.3 |
| 3,035,026 | 5/1962 | Stephens | 260/75 |
| 3,652,502 | 3/1972 | Jackson et al. | 260/75 R |
| 3,692,744 | 9/1972 | Rich et al. | 260/75 T |
| 3,994,863 | 11/1976 | Kovacs et al. | 528/296 |
| 4,010,041 | 3/1977 | Dean et al. | 106/287 R |
| 4,018,848 | 4/1977 | Khanna | 528/514 |
| 4,024,111 | 5/1971 | Thomas et al. | 260/75 T |
| 4,226,755 | 10/1980 | Knecht | 528/296 |

FOREIGN PATENT DOCUMENTS 2417556 10/1974 Fed. Rep. of Germany.

OTHER PUBLICATIONS

CA; 80:84189f; 1974.
CA; 81:120239d; 1974.
CA; 82:157608v; 1975.
CA; 83:29804q; 1975.

*Primary Examiner*—Theodore E. Pertilla
*Attorney, Agent, or Firm*—Hilmar L. Fricke

[57] ABSTRACT

A thermosetting coating composition having a binder of a film forming polymer having reactive hydroxyl groups, epoxy groups or methylol groups and a melamine, benzoguanamine or urea crosslinking agent and about 0.1-10% by weight of reactive catalyst which is a solid at 30° C. in which the catalyst has one of the following structures:

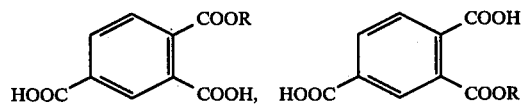

or mixtures of the above;

where R is an alkyl group or a hydroxy alkyl group having 1-18 carbon atoms; the catalyst is prepared by reacting in a 1:1 molar ratio trimellitic anhydride and an aliphatic monohydric alcohol or an aliphatic diol.

5 Claims, No Drawings

LIQUID COATING COMPOSITION HAVING A REACTIVE CATALYST

CROSS REFERENCE TO RELATED APPLICATIONS

This application is a divisional application of Ser. No. 06/144,299 filed Apr. 28, 1980.

BACKGROUND OF THE INVENTION

This invention related to coating compositions having a reactive catalyst.

Crosslinking agents for powder coating compositions of trimellitic anhydride and an aliphatic diol containing 2-10 carbon atoms in a molar ratio of anhydride to diol of 2/1 to 1.5/1 are known as shown in Thomas et al. U.S. Pat. No. 4,024,111. These crosslinking agents do not work well in high solids coating compositions. There is a need for a catalyst for liquid high solids coating compositions that will remain unreactive in the composition but after the composition is applied, the catalyst will react during baking of the composition. The catalyst not only catalyzes the crosslinking reaction but reacts with the film forming constituents of the composition to form a durable, crosslinked finish.

SUMMARY OF THE INVENTION

A thermosetting coating composition having a binder of a film forming polymer having reactive hydroxyl groups, epoxy groups or methylol groups and a melamine, benzoguanamine or urea crosslinking agent and about 0.1-10%, by weight, based on the weight of the coating composition, of reactive catalyst which is a solid at 30° C. and has a structure selected from the following group:

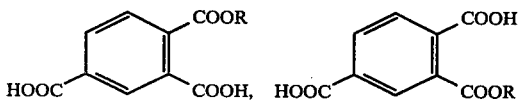

or mixtures of the above;
wherein R is an alkyl group or a hydroxy alkyl group having 1-18 carbon atoms in the alkyl group or hydroxy alkyl group. The process for making the catalyst comprises reacting in a 1:1 molar ratio trimellitic anhydride and an aliphatic monohydric alcohol or an aliphatic diol each having 1-18 carbon atoms at about 125°-250° C. for about 10 minutes-2 hours.

DETAILED DESCRIPTION OF THE INVENTION

The reactive catalyst is a solid at 30° C. and does not react with film-forming constituents of high solids coating compositions under temperatures of conventional storage conditions and under usual application conditions and temperatures. When the composition is baked after application, the catalyst not only catalyzes the crosslinking reaction but reacts with the film forming constituents of the composition to form a durable, crosslinked finish.

In the process for preparing the reactive catalyst, trimellitic anhydride is reacted with an aliphatic monohydric alcohol or an aliphatic diol in a molar ratio of trimellitic anhydride to alcohol or diol of about 1:1. The catalyst is prepared by reacting the above constituents at about 125°-250° C. for about 10 minutes to 2 hours. The resulting catalyst is then cooled to room temperature and if a solid, divided for example, by grinding.

Typical aliphatic monohydric alcohols and diols that can be used have 1-18 carbon atoms and are as follows: methyl alcohol, butyl alcohol, ethyl alcohol, propyl alcohol, ethylene glycol, propylene glycol, hexyl alcohol, 1,4-hexanediol, 1,6-hexanediol, heptyl alcohol 2-ethyl 1,3-hexanediol, 2-ethylhexyl alcohol, nonyl alcohol, decyl alcohol, lauryl alcohol, stearyl alcohol and the like.

The alcohol or diol is chosen to form a catalyst which will melt and or dissolve at a desired temperature to catalyze and react with the film forming constituents of a coating composition.

Preferred reactive catalysts that are used in a variety of coating compositions are as follows:
monoester of trimellitic anhydride and lauryl alcohol and
monoester of trimellitic anhydride and 2-ethyl 1,3-hexanediol.

About 1.0-10% by weight, based on the weight of a coating composition, of catalyst is added to a coating composition. Under some circumstances it may be desirable to add a greater amount of catalyst.

Typical coating compositions in which the catalyst can be used are as follows:
thermosetting acrylic enamels containing a reactive acrylic constituent and a crosslinking agent such as melamine formaldehyde resin, alkylated melamine formaldehyde resin, urea formaldehyde resin, or benzoguanamine formaldehyde resin;
thermosetting polyester or alkyd enamels containing a reactive polyester or alkyd resin and one of the aforementioned crosslinking agents;
thermosetting epoxy resin compositions containing an epoxy resin and one of the aforementioned crosslinking agents;
thermosetting epoxy ester resin composition containing an epoxy ester resin and one of the aforementioned crosslinking agents.

One useful coating composition comprises a blend of polyester resins, an acrylic resin, an epoxy ester resin, hexamethoxy methylmelamine with about 1 to 5% by weight, based on the weight of the composition, of a catalyst of the mono ester of trimellitic anhydride and 2-ethyl 1,3-hexanediol.

Coating compositions containing the reactive catalyst can be applied by conventional techniques such as spraying, electrostatic spraying, roller coating, flow coating, dip coating, electrocoating, brushing and the like and baked at a temperature sufficiently high that will activate the catalyst usually at about 95°-225° C. for about 10 minutes to 2 hours.

With the reactive catalyst in a coating composition, the composition can be baked at lower temperatures than compositions without the catalyst and still form a fully crosslinked finish. Also, finishes of compositions containing the catalyst generally are smoother, harder, have improved adhesion to the substrate and improved gloss in comparison to finishes of composition that do not contain the reactive catalyst.

The following examples illustrate the invention. All parts and percentages are on a weight basis unless otherwise indicated.

EXAMPLE 1

Catalyst I is prepared as follows:

| | Parts by Weight |
|---|---|
| Trimellitic anhydride | 384 |
| Neodecanol | 405 |
| Total | 789 |

The above constituents are charged into a reaction vessel and heated to 185° C. and held at this temperature for about five minutes. The vessel is cooled to room temperature and a waxy solid is formed. A 50% dispersion is formed by blending 50 parts of catalyst I with 50 parts methyl ethyl ketone.

Catalyst II is prepared as follows:

| | Parts by Weight |
|---|---|
| Trimellitic anhydride | 768 |
| 2-ethyl 1,3-hexanediol | 584 |
| Total | 1352 |

The above constituents are charged into a reaction vessel and over a 10 minutes period slowly heated to 175° C. and then the heat source is removed. A waxy liquid is formed which is a solid at 30° C. A 70% solids dispersion is formed by adding butyl acetate.

About 5% by weight, based on the total weight of a coating composition, of Catalyst I dispersion is added to the following set coating compositions: a conventional thermosetting acrylic enamel of an acrylic resin and a methylated melamine formaldehyde resin; a polyester/methylated melamine formaldehyde resin; an epoxy/urea formaldehyde resin, an epoxy/benzoguanamine resin and an oligomeric polyester/methylated melamine formaldehyde resin. Similarly Catalyst II dispersion in the same amount was added to another set of the above coating compositions.

Each of the above prepared sets of coating composition are sprayed onto separate phosphatized steel panels and baked to form a finish. An identical set of finished panels is prepared from the above coating compositions that did not contain a catalyst. In each case, the finishes of the coating compositions that contained catalysts have improved hardness and gloss and can be baked at lower temperatures for a shorter time period in comparison to the compositions that did not contain a catalyst. Also, the compositions containing the catalyst had an acceptable shelf life at room temperature and at an elevated temperature.

EXAMPLE 2

A coating composition is prepared by first forming the following mill bases and then blending these mill bases with resin solutions and a reactive catalyst.

| White Mill Base | Parts by Weight |
|---|---|
| Amyl acetate | 30.98 |
| Polyester solution I (83% solids of a polyester of neopentyl glycol/monoester of neopentyl glycol and hydroxypivalic acid/isophthalic acid/adipic acid/phthalic anhydride having an acid number below 8 and Gardner Holdt viscosity measured at 25° C. and at the above | 114.04 |

| White Mill Base | Parts by Weight |
|---|---|
| solids of $Z_2$–$Z_4$ in a solvent blend of xylene, 2-ethyl hexanol and amyl acetate) | |
| Polymeric dispersant (50% solids of a polymer of methyl methacrylate/2-ethyl hexyl acrylate having blocked isocyanate groups in a solvent blend of toluene, methyl ethyl ketone and methyl isobutyl ketone) | 9.71 |
| Titanium dioxide pigment | 311.90 |
| Total | 466.63 |

The above constituents are blended together and ground in a conventional sand mill to form a mill base.

| Colloidal Silica Mill Base | Parts by Weight |
|---|---|
| Polyester solution II (90% solids of a polyester of 2,2,4-trimethyl pentane-1,3-diol and isophthalic acid having an acid number less than 9 and a hydroxyl number of 200–260 and a Gardner Holdt viscosity measured at 25° C. at the above solids of $Z$–$Z_4$ in toluene) | 46.03 |
| Polyester Solution III (100% solids of a polyester of 2,2,4-trimethyl pentane-1,3-diol and mixed methyl esters of succinic acid/glutaric acid/adipic acid a weight ratio of 1:2:1 and having a Gardner Holdt viscosity at 25° C. of R-U and a hydroxyl No. 220–270) | 24.79 |
| Butyl acetate | 19.85 |
| Hexamethoxymethyl melamine | 75.42 |
| Colloidal silica | 8.34 |
| Total | 174.43 |

The above constituents are blended together and charged into a conventional sand mill and ground to form a mill base.

| Carbon Black Mill Base | Parts by Weight |
|---|---|
| Polymeric dispersant (described above) | 0.61 |
| Amyl acetate | 0.79 |
| Polyester solution III (described above) | 1.79 |
| Polyester solution II (described above) | 4.02 |
| Carbon Black Pigment (furnace type carbon black) | 0.59 |
| Polyester solution III (described above) | 0.16 |
| Amyl acetate | 0.16 |
| Total | 8.12 |

The above constituents are added to a mixing vessel in the order as listed above and mixed together and the resulting mixture is charged into a conventional sand mill and ground to form a mill base.

| Yellow Mill Base | Parts by Weight |
|---|---|
| Polyester solution II (described above) | 11.32 |
| Polyester solution III (described above) | 5.50 |
| Polymeric dispersant (described above) | 1.72 |

| Yellow Mill Base | Parts by Weight |
|---|---|
| Amyl acetate | 1.61 |
| Ferrite yellow orange pigment | 16.49 |
| Total | 36.65 |

The above constituents are blended together and charged into a conventional sand mill and ground to form a mill base.

A catalyst dispersion is prepared as follows:

| | Parts by Weight |
|---|---|
| Portion 1 | |
| 2-Ethyl 1,3-hexanediol | 290.18 |
| Portion 2 | |
| Trimellitic anhydride | 381.60 |
| Portion 3 | |
| Ethylene glycol monoethyl ether acetate | 288.22 |
| Total | 960.00 |

Portion 1 is charged into a reaction vessel and heated to about 82° C. and then portion 2 is added and heated to about 105° C. and heat is turned off and the temperature increases to about 175° C. and held at this temperature for about 5 minutes, portion 3 is added and the resulting dispersion is cooled to room temperature.

A coating composition is prepared by thoroughly blending together the following constituents:

| | Parts by Weight |
|---|---|
| Portion 1 | |
| White Mill Base (prepared above) | 411.2 |
| Colloidal Silica Mill Base (prepared above) | 153.7 |
| Portion 2 | |
| Polyester resin solution II (described above) | 16.9 |
| Toluene | 1.3 |
| Aromatic controlled VM&P Naphtha | 0.6 |
| Portion 3 | |
| Polyester solution I (described above) | 56.6 |
| Xylene | 3.1 |
| Amyl acetate | 3.1 |
| 2-Ethyl hexanol (plasticizer grade) | 2.3 |
| Portion 4 | |
| Hexamethoxymethyl melamine | 80.7 |
| Portion 5 | |
| Epoxy resin dehydrated castor oil ester | 34.3 |
| Hydrocarbon solvent (boiling point 182-192° C. aniline point 280° C.) | 41.9 |
| Portion 6 | |
| Acrylic resin solution (60% solids of a styrene/butyl acrylate/ hydroxy ethyl acrylate/acrylic acid polymer weight ratio 50/38/8/4, having an acid No. 28-32, and a Gardner Holdt viscosity measured at 25° C. at the above solids U-X) | 29.4 |
| Petroleum Naphtha | 6.1 |
| Ethylene glycol monoethyl ether acetate | 11.3 |
| N—Butyl alcohol | 2.2 |
| Portion 7 | |
| N—Butyl alcohol | 16.2 |

| | Parts by Weight |
|---|---|
| Microcrystalline wax 94-102° C. melting point | 3.2 |
| N—butyl alcohol | 13.0 |
| Portion 8 | |
| Catalyst dispersion (prepared above) | 29.5 |
| Ethylene glycol monoethyl ether acetate | 12.6 |
| Portion 9 | |
| Disulfonic Acid Solution (40% solids in isobutanol) | 0.4 |
| Isobutanol | 0.6 |
| Portion 10 | |
| N,N—dimethyl ethanol amine | 0.1 |
| Portion 11 | |
| Amorphous silica having an average particle size of about 9 microns | 30.4 |
| Portion 12 | |
| Carbon Black Mill Base (prepared above) | 7.2 |
| Portion 13 | |
| Yellow Mill Base (prepared above) | 32.2 |
| Total | 1000.2 |

Portions 2, 3 and 5-9 are premixed and then portions 1-13 are charged into a mixing vessel in the order shown and thoroughly mixed after each addition to form a coating composition. The resulting coating composition contains 32.75% by weight pigment, 48.69% by weight binder and has a weight solids content of 81.43%.

The coating composition is applied by spraying under standard conditions to a phosphatized steel substrate and baked for 20 minutes at 163° C. to form a film 1.2 mils thick that has the following properties: 4H pencil hardness, resistant to 50 rubs with methyl ethyl ketone, gloss measured at 60° of 60 (semigloss product), excellent adhesion, impact resistance at 40 inch pounds—no cracks in finish, salt spray resistance—exposure 500 hours—0 to 1/16 inch creep from scored line in finish, humidity resistance—no blisters after 1000 hours exposure in humidity cabinet.

We claim:

1. A thermosetting coating composition comprising a binder of a film forming acrylic polymer or polyester polymer having reactive hydroxyl groups, carboxyl groups or methylol groups and a crosslinking agent selected from the group consisting of melamine formaldehyde resin, alkylated melamine formaldehyde resin, urea formaldehyde resin or benzoguanamine formaldehyde resin and about 0.1-10% by weight, based on the weight of the coating composition, of reactive catalyst which is a solid at 30° C. and comprises a structure selected from the group of

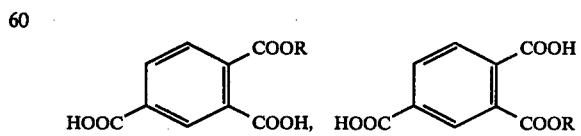

and mixtures thereof;
wherein R is the residue of neodecanol or 2-ethyl 1,3-hexanediol.

2. The thermosetting coating composition of claim 1 which the R group of the reactive catalyst is the residue of 2-ethyl 1,3-hexanediol.

3. The thermosetting coating composition of claim 1 in which the R group of the reactive catalyst is the residue of neodecanol.

4. The thermosetting coating composition of claim 1 in which the binder is an acrylic polymer having reactive hydroxyl groups, carboxyl groups or mixtures thereof and an alkylated melamine formaldehyde resin crosslinking agent.

5. The thermosetting coating composition of claim 1 in which the binder is a polyester having reactive hydroxyl or carboxyl groups and an alkylated melamine formaldehyde crosslinking agent.

* * * * *